United States Patent [19]

Seberger

[11] Patent Number: 5,434,774
[45] Date of Patent: Jul. 18, 1995

[54] INTERFACE APPARATUS FOR TWO-WIRE COMMUNICATION IN PROCESS CONTROL LOOPS

[75] Inventor: Stephen G. Seberger, Marshalltown, Iowa

[73] Assignee: Fisher Controls International, Inc., Clayton, Mo.

[21] Appl. No.: 204,636

[22] Filed: Mar. 2, 1994

[51] Int. Cl.⁶ ............................................. G05B 11/32
[52] U.S. Cl. ........................................ 364/172; 364/130; 340/870.07
[58] Field of Search ................... 340/541, 506, 517, 825.05–825.54, 340/310 A, 310 LP, 870.01, 870.39; 318/318; 365/551; 367/76; 364/130, 172; 375/37, 36, 5, 7, 24, 25

[56] References Cited

U.S. PATENT DOCUMENTS

| | | | |
|---|---|---|---|
| 3,905,355 | 9/1975 | Brudny | 128/2.1 M |
| 4,007,458 | 2/1977 | Hollabaugh | 340/310 R |
| 4,131,882 | 12/1978 | Hollabaugh et al. | 340/310 A |
| 4,176,395 | 11/1979 | Evelyn-Verre et al. | 364/420 |
| 4,190,822 | 2/1980 | Swarbrick | 340/870.39 |
| 4,272,758 | 6/1981 | Girard | 340/310.02 |
| 4,387,434 | 6/1983 | Moncrief, Jr. et al. | 364/509 |
| 4,412,450 | 11/1983 | Franz et al. | 73/304 L |
| 4,481,967 | 11/1984 | Frick | 137/85 |
| 4,520,488 | 5/1985 | Hourig et al. | 375/5 |
| 4,554,532 | 11/1985 | Ise et al. | 340/501 |
| 4,556,866 | 12/1985 | Gorecki | 340/310 A |
| 4,633,217 | 12/1986 | Akano | 340/870.39 |
| 4,691,328 | 9/1987 | Sterling, Jr. et al. | 375/36 |
| 4,697,166 | 9/1987 | Warnagiris et al. | 340/310 R |
| 4,733,144 | 3/1988 | Bisseling | 318/318 |
| 4,831,375 | 5/1989 | Kajiura | 340/870.39 |
| 4,855,714 | 8/1989 | Clarkson et al. | 340/521 |
| 4,916,628 | 4/1990 | Kugler | 364/492 |
| 4,933,668 | 6/1990 | Oyer et al. | 340/541 |
| 4,940,056 | 7/1990 | Heck et al. | 128/639 |
| 4,953,986 | 9/1990 | Olson et al. | 374/136 |
| 4,959,649 | 9/1990 | Akano | 340/870.42 |
| 5,063,371 | 11/1991 | Oyer et al. | 340/541 |
| 5,099,504 | 3/1992 | Pettit | 378/54 |
| 5,151,017 | 9/1992 | Sears et al. | 417/45 |
| 5,153,448 | 10/1992 | Zierhut | 307/1 |
| 5,200,930 | 4/1993 | Rouquette | 367/76 |

*Primary Examiner*—James P. Trammell
*Attorney, Agent, or Firm*—Marshall, O'Toole, Gerstein, Murray & Borun

[57] ABSTRACT

A process control system includes a process controller that develops a controller output signal having at least a desired DC component and an undesired AC component and a device having an adjustable parameter. An interface apparatus is coupled to the process controller and to the device via a two-wire loop, and means are provided for coupling a communication signal onto the two-wire loop between the interface apparatus and the device. The interface apparatus includes means for substantially attenuating the undesired AC component and means electrically coupled to the attenuating means for substantially preventing the communication signal from electrically affecting the process controller. The device is responsive to the DC component of the controller output signal, and the adjustable parameter of the device is responsive to the communication signal.

19 Claims, 1 Drawing Sheet

INTERFACE APPARATUS FOR TWO-WIRE COMMUNICATION IN PROCESS CONTROL LOOPS

This invention relates generally to a process control system including a process controller and process instruments and more particularly to an interface apparatus for use in such a system.

BACKGROUND OF THE INVENTION

Process instruments such as current-to-pressure transducers and valve positioners are conventionally employed in industrial processes and are controlled by a process controller which is generally located remotely from and coupled to the transducer or positioner by a two-wire link. The process controller provides a variable DC control current signal of between 4 and 20 mA over the two-wire link to the transducer or positioner or to any other controllable device or instrument. The control current level changes the state of the controllable device in proportion to the strength of the variable DC current signal. For example, a valve positioner might fully open a valve in response to a 4 mA control current and fully close the valve in response to a 20 mA control current.

In addition to being responsive to a variable control signal, current-to-pressure transducers and valve positioners have variable parameters which may be adjusted to control the operating characteristics of such devices. Previously, these devices or process instruments were adjusted manually when it was necessary to change the instrument parameters such as the zero level, instrument range, output pressure, or valve travel.

With the advent of so-called "smart" devices capable of bidirectional communication, it has become possible for the above-described adjustments to be made automatically and from a location remote from the device or field instrument. Moreover, diagnostic testing and instrument monitoring can also be conducted from a remote location. However, means must then be provided for transmitting a communication signal from a communication site to the field instrument in order to implement the adjustments and the field testing.

Because the process controller and the communication site are often located a substantial distance from the field instrument, undue effort and expense is required to provide communication lines independent from the two-wire control loop interconnecting the communication site with the field instrument. Accordingly, it is desirable to transmit the communication signal over the two-wire control loop together with the 4-20 mA control signal so that additional wiring will not be required. To that end, the modulated digital communication signal is superimposed on the 4-20 mA DC analog control signal used to control the field instrument in order to allow serial communication of data bit streams between the field instrument and the communication site.

However, the presence of the modulated digital communication signals, i.e., the AC communication signals on the two-wire control loop can adversely affect the performance of the process control system, and undesirable characteristics of the process controller can adversely affect the AC communication signals. For example, some process controllers have an output impedance that is low enough to attenuate the communication signal so that the communication signal cannot be reliably detected by the field instrument. As another example, some process controllers output a 4-20 mA DC analog control signal containing transients, noise, or other undesired AC components that can interfere with the modulated digital communication signals on the two-wire control loop. As a third example, during digital communication, the modulation of voltage on the two-wire control loop can adversely affect the output current of the process controller or current readback circuits.

It is therefore desirable to couple an interface apparatus between the process controller and the field instrument. Such an interface apparatus must be designed to regulate the analog control signal to remove unwanted noise therefrom and to effectively isolate the process controller from the digital communication signal by providing the interface apparatus with an output having a high impedance to frequencies present in the digital communication signal.

Several attempts to integrate such an interface apparatus into a process control loop have proven unsuccessful. A passive RC circuit, for example, either has an output impedance that is too low to allow modulation of the voltage by the communication signal or has an input-to-output head voltage that is too high to maintain electrical compatibility between the process controller output signal and the device. In limited circumstances, an inductor could achieve some of the benefits of the present invention, but, the inductor would have to be prohibitively large and heavy in order to achieve those benefits.

SUMMARY OF THE INVENTION

In accordance with one aspect of the present invention, a process control system includes a process controller that develops a controller output signal having at least a desired DC component and an undesired AC component and a smart field device having a digitally adjustable parameter. An interface apparatus is coupled to the process controller and to the device via a two-wire loop, and means are provided for coupling a communication signal onto the two-wire loop between the interface apparatus and the device. The interface apparatus of the present invention includes means for substantially attenuating the undesired AC component from the process controller and means electrically coupled to the attenuating means for substantially preventing the communication signal from electrically affecting the process controller or from being so attenuated as to be undetectable. The device is responsive to the DC component of the controller output signal, and the adjustable parameter of the device is responsive to the communication signal.

Where the process is operated in a hazardous environment and it is necessary to provide an intrinsic safety barrier in the process control loop, the interface apparatus of the present invention and the communication signal are electrically compatible with the intrinsic safety barrier.

In accordance with another aspect of the present invention, an interface apparatus is provided for coupling in a process control system for permitting a communication signal to be coupled to a two-wire loop interconnecting first and second controller output terminals of a process controller that develops a controller output signal at the first and second controller output terminals including at least a desired DC component and an undesired AC component and first and second device input terminals of a device responsive to the DC component, wherein the device has an adjustable parameter responsive to the communication signal. The interface apparatus converts the controller output signal into an interface output signal for coupling to the device. The interface apparatus includes means for substantially attenuating the undesired AC component of the controller output signal in the interface output signal and means electrically coupled to the attenuating means for substantially preventing the communication signal from electrically affecting the process controller. The interface apparatus is coupled between the first and second controller output terminals and the first and second device input terminals, and the communication signal is coupled to the two-wire loop between the interface apparatus and the device.

The interface apparatus of the present invention enables reliable bidirectional transmission of a communication signal to be achieved between the field instrument and a communication site remote from the field instrument over the same two-wire loop on which the process controller transmits control signals to the field instrument. Accordingly, it is possible to provide such bidirectional communication without the need for costly and burdensome installation of additional wiring. Moreover, the interface apparatus of the present invention prevents the communication signal from adversely affecting the performance of the process controller and from being so attenuated as to be undetectable and also attenuates noise introduced onto the two-wire loop by the process controller so that such noise cannot interfere appreciably with the communication signal.

In the preferred embodiment of the invention, the interface apparatus is an active device powered, at least in part, by the controller output signal and includes a capacitor coupled to the process controller output. An adjustable voltage reference circuit and a high-impedance current source substantially prevent the communication signal from electrically affecting the process controller.

BRIEF DESCRIPTION OF THE DRAWINGS

Those features of the present invention which are believed to be novel are set forth with particularity in the appended claims. The invention may be best understood by reference to the following description taken in conjunction with the accompanying drawings in which like reference numerals identify like elements in the several figures and in which:

DETAILED DESCRIPTION

Figure 1:
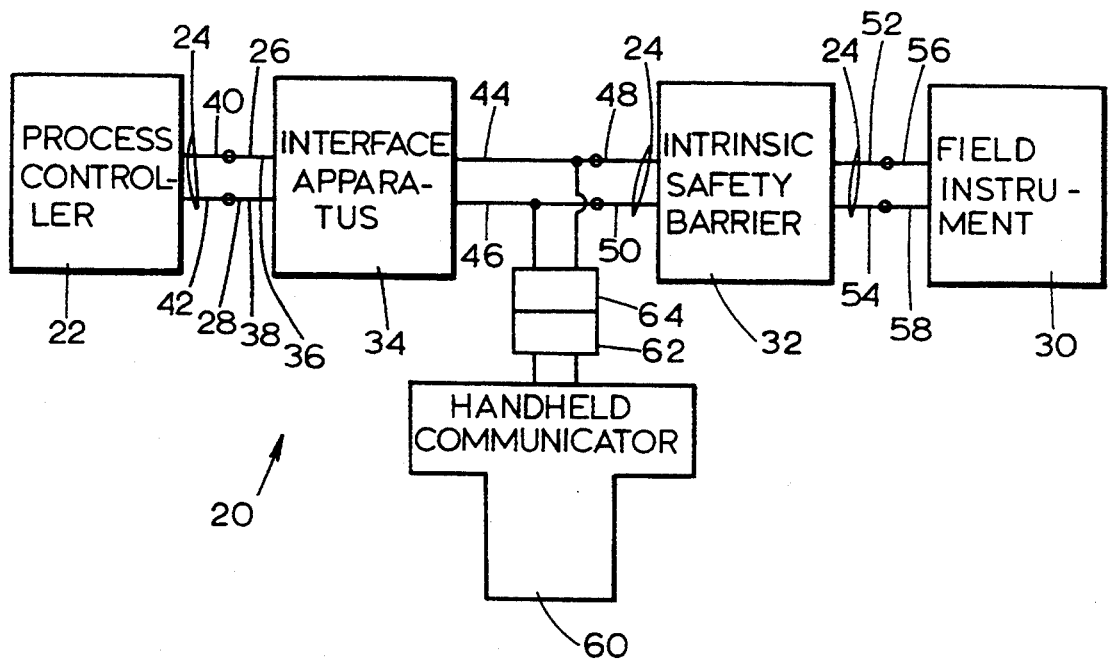
FIG. 1 is a block diagram illustrating a process control system in accordance with the present invention.

Referring initially to FIG. 1, a process control system 20 includes a process controller 22 coupled to a two-wire control loop 24 including first and second wires 26, 28. A highway-addressable remote transducer (HART) field instrument or device 30 such as a current-to-pressure transducer or valve positioner is also coupled to the control wires 26, 28.

An intrinsic safety barrier 32 may optionally be coupled to the control wires 26, 28 between the process controller 22 and the device 30. The intrinsic safety barrier 32 is an energy limiter that substantially prevents electrical signals on the control loop 24 between the barrier 32 and the field instrument 30 from igniting combustible or flammable materials present in the hazardous environments in which the field instrument 30 is commonly used.

In accordance with the present invention, an interface apparatus 34 is coupled to the control loop 24 between the process controller 22 and the field instrument 30. Specifically, the interface apparatus 34 has first and second interface input terminals 36, 38 which are coupled to first and second controller output terminals 40, 42 of the process controller 22. The interface apparatus 34 also includes first and second interface output terminals 44, 46 which are coupled to first and second barrier input terminals 48, 50 of the intrinsic safety barrier 32.

The intrinsic safety barrier 32 includes first and second barrier output terminals 52, 54 which, in turn, are coupled to first and second device input terminals 56, 58 of the device 30. Of course, if the optional intrinsic safety barrier 32 is omitted from the process control system 20, the first and second interface output terminals 44, 46 are respectively coupled directly to the first and second device input terminals 56, 58 of the device 30. While the intrinsic safety barrier 32 is a conventional device which forms no part of the present invention, the output produced by the interface apparatus 34 of the present invention enables the interface apparatus 34 to be used compatibly with an intrinsic safety barrier 32 in those applications where one is necessary. Moreover, the intrinsic safety barrier 34, when present, is also electrically compatible with the communication signal (described below) which is coupled onto the first and second wires 26, 28 of the two-wire control loop 24.

The device 30 is a so-called "smart" device capable of receiving a communication signal from an external source for setting parameters and making adjustments to components of the device 30. The device 30 is also capable of providing information to the communication site to facilitate diagnostic testing and interrogation of the device 30 by an operator of the process control system 20.

To provide for such communication, a hand-held communicator 60 is coupled to the two-wire control loop 24. As shown in FIG. 1, the communicator 60 is coupled to the two-wire control loop 24 near the output of the interface apparatus 34, but the communicator 60 can be coupled to the two-wire control loop 24 at any convenient location between the interface apparatus 34 and the field instrument or device 30 (on either side of the intrinsic safety barrier 32, if present). In addition, the communicator 60 shown in FIG. 1 generally includes an optional two-wire input/output connector 62 which is removably coupled with a mating connector 64 which, in turn, is coupled to the two-wire control loop 24. The removable connector 62 is provided simply for convenience so that the hand-held communicator 60 can be disconnected from the control loop 24 and reconnected as necessary. When stationary communication equipment is used instead of the hand-held communicator 60, the removable connector 62 and the connector 64 will not be required if such equipment can be permanently coupled to the control loop 24.

The hand-held communicator 60 is operable to provide communication signals to the device 30 via the two-wire control loop 24 in order to permit a system operator to adjust parameters of the device 30 and interrogate the device 30 to check the status thereof. While FIG. 1 depicts a hand-held communicator 60, such as the Fisher-Rosemount Model 268 hand-held communicator, any suitable equipment may be used to facilitate communication with the device 30.

The communication signals conveyed to and from the device 30 on the first and second control loop wires 26, 28 are modulated digital communication signals, i.e., AC communication signals modulated onto the variable DC control signal provided by the interface apparatus 34 to the device 30. These AC communication signals could disrupt the operation of the process controller 22 in the absence of the interface apparatus 34. Moreover, the process controller 22 could produce distortion in the variable DC component of the control signal, and this distortion could interfere with the communication signal when present on the control loop 24.

For the foregoing reasons, the interface apparatus 34 is coupled between the process controller 22 and the device 30. The interface apparatus 34 is preferably an active device which is powered, at least in part, by the controller output signal. Moreover, the interface apparatus 34 has a high-impedance output which prevents the communication signal from interfering with the process controller 22 and ensures that the communication signal is not so attenuated by the interface apparatus 34 as to be undetectable by the device 30. The interface apparatus 34 also filters the controller output signal to prevent noise, transients, or other undesired AC components produced by the process controller 22 from interfering with the communication signal when present on the control loop 24.

Figure 2:
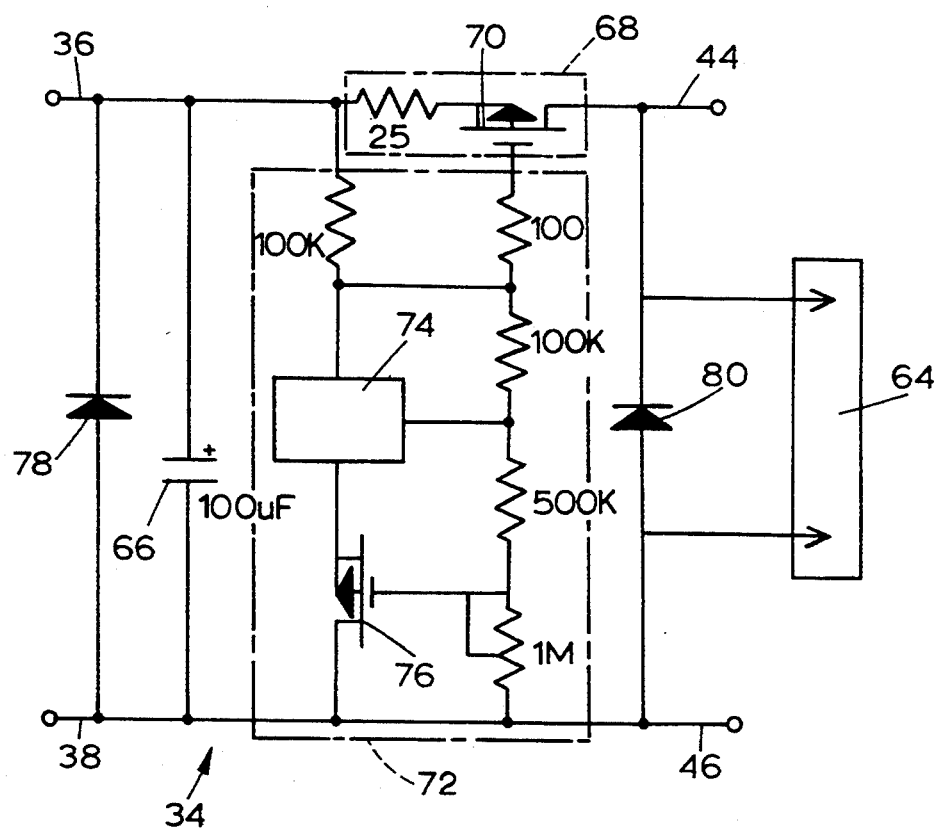
FIG. 2 is a schematic diagram illustrating a preferred embodiment of the interface apparatus shown in FIG. 1.

Referring now to FIG. 2, the structure and operation of the interface apparatus 34 is described in more detail. The interface apparatus 34 includes a capacitor 66 connected across the control loop wires 26, 28 for filtering the controller output signal developed by the process controller 22 and for storing energy therein. The interface apparatus 34 also includes a current drive stage 68. The current drive stage 68 delivers a high-impedance output current to the interface output terminals 44, 46 as a function of the voltage across the capacitor 66. In the interface apparatus 34 shown in FIG. 2, the high-impedance characteristic of the current output is provided by the open-drain configuration of the enhancement-mode p-channel field-effect transistor 70. An electrical network 72 including an adjustable voltage reference 74, such as National Semiconductor Company's LM285, is provided to produce appropriate biasing of the transistor 70. The electrical network 72 includes a transistor 76 that provides a voltage offset to maintain the adjustable voltage reference 74 within its operating limits as the input voltage to the interface apparatus 34 is adjusted. It should be noted that the high-impedance output current may be developed by any suitable means and that the enhancement-mode p-channel transistor is described herein simply as an example.

In operation, upon the initial application of current from the controller 22, the capacitor 66 begins to charge. When the capacitor 66 is charged beyond the set voltage of the transistor 70, an output current appears at the high-impedance output terminals 44, 46 of the interface apparatus 34.

The desired output current can only flow from the interface apparatus 34 when a first potential difference between the first and second interface output terminals 44, 46 is lower than a second potential difference between the first and second interface input terminals 36, 38. This required input-to-output voltage difference, termed the "voltage drop," must be small enough to ensure that the DC component of the controller output signal, which is coupled by the interface apparatus 34 to the device 30, is electrically compatible with the device 30. Of course, if the voltage drop produced by the interface apparatus 34 is too high, the device 30 will not be controlled properly by the process controller 22. The interface apparatus 34 as shown in FIG. 2 generally will require a voltage drop of at least two volts for proper operation, but the voltage drop must nonetheless be small enough to ensure compatibility between the controller 22 and the device 30. The actual output voltage of the interface will be determined by the output current and the load impedance. Also, in this embodiment, wherein the interface apparatus 34 is powered solely by the control signal, the interface apparatus 34 draws an operating current of approximately forty to sixty microamps from the loop.

A diode 78 is connected between the first and second interface input terminals 36, 38 of the interface apparatus 34 to protect the interface apparatus 34 from damage that may result if the interface apparatus 34 is coupled to the process controller 22 with the incorrect polarity. Similarly, a diode 80 is connected between the first and second interface output terminals 44, 46 of the interface apparatus 34 to prevent damage that may result from static discharge or from the interface apparatus 34 being improperly installed in the loop.

As shown in FIG. 2, the connector 64, for example, a 2-conductor AMP "Mini Universal Mate-N-Lock" connector, is coupled to the first and second interface output terminals 44, 46. The connector 64 is intended for use with a hand-held communicator, such as the Fisher-Rosemount Model 268, or with a HART-compatible multiplexing device, either of which must be provided with a mating connector 62 as described above. It should be noted that the communicator 60 may be coupled directly to the two-wire control loop 24 at any desired location between the interface apparatus 34 and the device 30; the connector 64 is provided simply for convenience.

It should also be noted that the network topology of the interface apparatus 34 depicted in FIGS. 1 and 2 represents only one embodiment of the present invention. One alternative could be a circuit employing an operational amplifier suitably configured to serve as a high-impedance current source along with means for regulating the output current from the process controller 22. Of course, many other network designs will be apparent to those of ordinary skill in the art following the principle of the invention and the teachings herein.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. A process control system, comprising:
   a process controller that develops a controller output signal having at least a desired DC component;
   a device having an adjustable parameter adjustable by suitable communication signals from a remote location, said device controllable by the desired DC component of said controller output signal;
   a control loop, including a two-wire loop;

an interface apparatus coupled to the process controller and to the device via said two-wire loop; and means for coupling a communication signal from a remote location onto the two-wire loop between the interface apparatus and the device for adjusting said adjustable parameter;

said interface apparatus including enabling means for enabling reliable control of said device by said desired DC component of said controller output signal when the communication signal is present on the two-wire loop and for enabling reliable communication to said device for adjusting said adjustable parameter.

2. The process control system of claim 1, wherein the enabling means includes preventing means for substantially preventing the interface apparatus from so attenuating the communication signal that the communication signal cannot adjust said adjustable parameter.

3. The process control system of claim 1, wherein the enabling means includes blocking means for substantially preventing the communication signal from electrically affecting the process controller.

4. The process control system of claim 1, wherein the controller output signal has an undesired AC component, and the enabling means includes attenuating means for substantially attenuating the undesired AC component.

5. The process control system of claim 4, wherein the enabling means further includes preventing means for substantially preventing the interface apparatus from so attenuating the communication signal that the communication signal cannot adjust said adjustable parameter and for substantially preventing the communication signal from electrically affecting the process controller.

6. The process control system of claim 5, wherein a voltage drop which is produced across the interface apparatus is small enough to maintain electrical compatibility of the DC component of the controller output signal with the device.

7. The process control system of claim 5, wherein the enabling means includes an adjustable voltage reference and a high-impedance current source.

8. The process control system of claim 7, wherein a voltage drop is produced across the interface apparatus, and the voltage drop exceeds about two volts.

9. The process control system of claim 5, wherein the interface apparatus is powered, at least in part, by the controller output signal.

10. The process control system of claim 1, further including an intrinsic safety barrier electrically coupled between the interface apparatus and the device wherein the interface apparatus is electrically compatible with the intrinsic safety barrier.

11. An interface apparatus for use in a process control system for permitting a communication signal to be coupled to a two-wire loop interconnecting a process controller that develops a controller output signal having at least a desired DC component with a device responsive to the desired DC component wherein the device has an adjustable parameter responsive to the communication signal, the interface apparatus comprising:

means for coupling the interface apparatus to the two-wire loop;

means for coupling the communication signal to the interface apparatus; and enabling means for enabling reliable control of the device by the desired DC component of the controller output signal when the communication signal is present on the two-wire loop and for enabling reliable communication to the device for adjusting the adjustable parameter.

12. The interface apparatus of claim 11, wherein the enabling means includes preventing means for substantially preventing the interface apparatus from so attenuating the communication signal that the communication signal cannot adjust said adjustable parameter.

13. The interface apparatus of claim 11, wherein the enabling means includes blocking means for substantially preventing the communication signal from electrically affecting the process controller.

14. The interface apparatus of claim 11, wherein the controller output signal has an undesired AC component, and the enabling means includes attenuating means for substantially attenuating the undesired AC component of the controller output signal.

15. The interface apparatus of claim 14, wherein the enabling means further includes preventing means for substantially preventing the interface apparatus from so attenuating the communication signal that the communication signal cannot adjust said adjustable parameter and for substantially preventing the communication signal from electrically affecting the process controller.

16. The interface apparatus of claim 15, wherein a voltage drop is produced across the interface apparatus, and the voltage drop is small enough to maintain electrical compatibility of the DC component of the controller output signal with the device.

17. The interface apparatus of claim 15, wherein the enabling means includes an adjustable voltage reference and a high-impedance current source.

18. The interface apparatus of claim 17, wherein a voltage drop is produced across the interface apparatus, and the voltage drop exceeds about two volts.

19. The interface apparatus of claim 15, wherein the interface apparatus is powered, at least in part, by the controller output signal.

* * * * *